United States Patent
Wu et al.

(10) Patent No.: US 8,693,184 B2
(45) Date of Patent: Apr. 8, 2014

(54) ELECTRONIC APPARATUS

(75) Inventors: Chang-Yuan Wu, Taipei (TW);
Hui-Lian Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 232 days.

(21) Appl. No.: 13/282,486

(22) Filed: Oct. 27, 2011

(65) Prior Publication Data
US 2012/0106082 A1 May 3, 2012

Related U.S. Application Data

(60) Provisional application No. 61/407,927, filed on Oct. 29, 2010.

(51) Int. Cl.
*H05K 7/20* (2006.01)

(52) U.S. Cl.
USPC .. 361/679.47; 361/696; 361/709; 165/104.33

(58) Field of Classification Search
USPC ................ 361/679.46–679.54, 688–722
See application file for complete search history.

(56) References Cited

U.S. PATENT DOCUMENTS

| | | | |
|---|---|---|---|
| 6,113,485 A * | 9/2000 | Marquis et al. | 454/184 |
| 2005/0103477 A1* | 5/2005 | Kim et al. | 165/104.33 |
| 2008/0112130 A1* | 5/2008 | Nakamura | 361/687 |
| 2011/0157824 A1* | 6/2011 | Fujiwara | 361/695 |

* cited by examiner

*Primary Examiner* — Courtney Smith
(74) *Attorney, Agent, or Firm* — CKC & Partners Co., Ltd.

(57) ABSTRACT

An electronic apparatus includes a housing, a fan module, a heat-dissipating module, and a channel. The housing includes a first heat-dissipating vent and a second heat-dissipating vent. The fan module is disposed in the housing and includes a first outlet and a second outlet. The first outlet is substantially aligned with the first heat-dissipating vent and has a first airflow. The second outlet has a second airflow. The heat-dissipating module is disposed in the housing between the first outlet and the first heat-dissipating vent. The channel is located between the second outlet and the second heat-dissipating vent for guiding the second airflow out of the housing from the second heat-dissipating vent. The temperature of the first heat-dissipating vent is higher than that of the second heat-dissipating vent.

9 Claims, 4 Drawing Sheets

ELECTRONIC APPARATUS

RELATED APPLICATIONS

This application claims priority to U.S. provisional Application Ser. No. 61/407,927, filed Oct. 29, 2010, which is herein incorporated by reference.

BACKGROUND

1. Field of Invention

The present invention relates to an electronic apparatus.

2. Description of Related Art

Motors are used in a wide range of applications. For example, lathes, drills, saws, etc. used in various kinds of industries include motors, and tape recorders, CD-ROM (compact disc read-only memory) drives, hard drives, pumps, hair dryers, vacuum cleaners, refrigerators, air-conditioning compressors, fans, etc. used in daily life can not operate without motors. In today's information age, the dependence of people on electronic products is increasing. With the ability to offer the features of high-speed, high-performance, and full mobility by today's electronic products, various kinds of portable electronic devices have become ubiquitous. For example, portable electronic devices such as notebook computers, mobile phones, and personal digital assistants have become indispensable application tools of modern life and work.

In order to design a high-performance and compact electronic apparatus, the active cooling components therein must be reduced in size due to the minimal space offered, and still be able to perform the function of exhausting the air in the electronic apparatus to reduce the temperature therein and thus prevent damage to the inner electronic components. Among the active cooling components, fans are applied everywhere. In addition to large equipment for industrial use, many electronic products used in daily life, such as computer power supplies, air conditioners, etc., are equipped with fans to provide a cooling function.

A conventional fan operates by rotating a rotor (i.e., rotation shaft, hub, etc.) relative to a stator, so as to generate airflow that is circulated through an electronic apparatus and subsequently expelled out of the same.

However, the known fan has only one outlet. Such a design requires a lot of heat pipes to conduct heat from different heat sources to the outlet to thereby realize heat dissipation. A drawback of the use of many heat pipes is that the thickness of the electronic apparatus is increased. Even if a second outlet were provided so that the generated airflow expelled therethrough dissipates the heat of other heat sources, since there is no corresponding guiding structure in the electronic apparatus, it would not be possible to make full use of such a second outlet.

SUMMARY

In order to solve the problems of the prior art, the invention provides an improved electronic apparatus. The electronic apparatus of the invention is capable of exhausting heat in a housing of the electronic apparatus out of a first heat-dissipating vent and a second heat-dissipating vent by a first outlet and a second outlet formed on a fan module disposed in the housing. A channel is formed by disposing a guiding structure that is communicated between the second outlet and the second heat-dissipating vent on the lower part of the housing, in which the layout of the guiding structure is along a second heat source on a circuit board. Therefore, not only can a first airflow that flows out from the first outlet of the fan module achieve the goal of exhausting the heat generated by a first heat source on the circuit board out of the first heat-dissipating vent, but also, the heat-dissipating efficiency of a second airflow that flows out from the second outlet for the second heat source can be greatly increased by the guidance provided by the guiding structure.

According to an embodiment of the invention, an electronic apparatus includes a housing, a fan module, a heat-dissipating module, and a channel. The housing includes a first heat-dissipating vent and a second heat-dissipating vent. The fan module is disposed in the housing. The fan module includes a first outlet and a second outlet. The first outlet is substantially aligned with the first heat-dissipating vent and has a first airflow. The second outlet has a second airflow. The heat-dissipating module is disposed in the housing between the first outlet and the first heat-dissipating vent. The channel is located between the second outlet and the second heat-dissipating vent for guiding the second airflow out of the housing from the second heat-dissipating vent. The temperature of the first heat-dissipating vent is higher than that of the second heat-dissipating vent.

In an embodiment of the invention, the electronic apparatus further includes a circuit board and a first heat source. The first heat source is connected to the circuit board. The circuit board is disposed in the housing. The heat-dissipating module is thermally connected to the first heat source. The first airflow passes through the heat-dissipating module from the first outlet and then is exhausted through the first heat-dissipating vent.

In an embodiment of the invention, the heat-dissipating module further includes a plurality of heat-dissipating fins and a heat pipe. The heat-dissipating fins are located between the first outlet and the first heat-dissipating vent. The first airflow passes through the heat-dissipating fins from the first outlet and then is exhausted through the first heat-dissipating vent. The heat pipe is thermally connected to the first heat source and connected to the heat-dissipating fins for conducting the heat generated by the first heat source to the heat-dissipating fins.

In an embodiment of the invention, the electronic apparatus further includes a circuit board and a second heat source. The second heat source is located on the circuit board and in the channel. The second airflow passes over the second heat source from the second outlet along the channel and then is exhausted through the second heat-dissipating vent.

In an embodiment of the invention, the electronic apparatus further includes a guiding structure. The guiding structure includes two walls and has a first end and a second end. The first end is connected to the periphery of the second outlet. The second end is connected to the periphery of the second heat-dissipating vent. The housing, the circuit board, and the walls form the channel. The second airflow passes over the second heat source from the second outlet along the channel and then is exhausted through the second heat-dissipating vent.

In an embodiment of the invention, the housing further includes at least one inlet. The inlet is located between the walls. The air outside of the housing is attracted to enter the housing via the inlet by the second airflow when the second airflow passes over the inlet.

In an embodiment of the invention, the housing and the guiding structure are connected to each other using a glue adhesive, a co-injection molding method, a hot-melt adhesive, or a screw fastening method.

In an embodiment of the invention, the circuit board and the guiding structure are connected to each other using a glue adhesive, a co-injection molding method, a hot-melt adhesive, or a screw fastening method.

In an embodiment of the invention, the fan module includes a fan housing. The first outlet and the second outlet are located on the fan housing.

The fan housing includes a protuberance located at the edge of the second outlet for controlling an angle with which the second airflow flows out of the second outlet.

In an embodiment of the invention, the air volume of the first airflow is larger than that of the second airflow.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
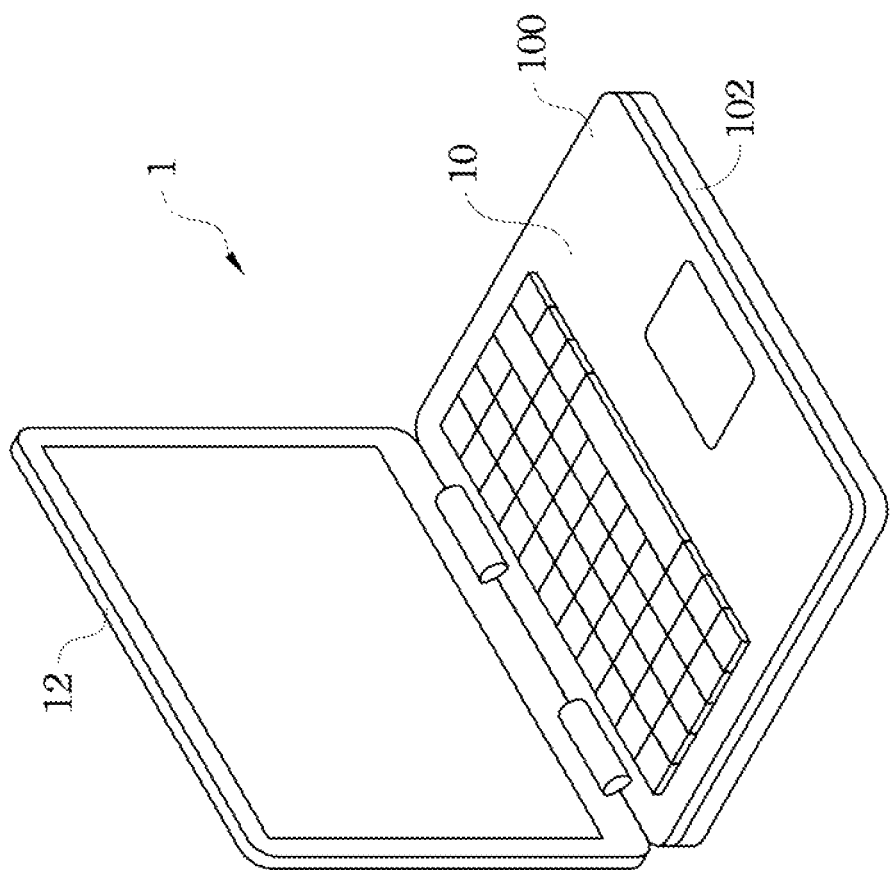
FIG. 1 is a perspective view of an electronic apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

An improved electronic apparatus is provided. Specifically, the electronic apparatus of the invention is capable of exhausting heat in a housing of the electronic apparatus out of a first heat-dissipating vent and a second heat-dissipating vent by a first outlet and a second outlet formed on a fan module disposed in the housing. A channel is formed by disposing a guiding structure that is communicated between the second outlet and the second heat-dissipating vent on the lower part of the housing, in which the layout of the guiding structure is along a second heat source on a circuit board. Therefore, the present invention not only can let a first airflow that flows out from the first outlet of the fan module achieve the goal of exhausting the heat generated by a first heat source on the circuit board out of the first heat-dissipating vent, but also, the heat-dissipating efficiency of a second airflow that flows out from the second outlet for the second heat source can be greatly increased by the guidance provided by the guiding structure.

FIG. 1 is a perspective view of an electronic apparatus 1 according to an embodiment of the invention. As shown in FIG. 1, the electronic apparatus 1 of the invention can be a computer device (e.g., a personal computer, a notebook computer, a tablet computer, etc.) or a consumer electronic product (e.g., a projector, a game console, etc.). That is, the electronic apparatus 1 of the invention can be any electronic product having a heat source therein. As long as there is a requirement to dissipate heat, the concepts of the invention can be applied to increase heat-dissipating efficiency during use of a fan module by the electronic apparatus 1.

As shown in FIG. 1, a notebook computer is used as an example of the electronic apparatus 1 of the invention. However, the invention is not limited in this regard. The electronic apparatus 1 includes a housing 10 and a display module 12. The display module 12 of the electronic apparatus 1 is pivotally connected to the housing 10 so that the display module 12 is capable of rotating relative to the housing 10. The housing 10 of the electronic apparatus 1 includes an upper part 100 and a lower part 102. Most of the main components of the electronic apparatus 1 are disposed between the upper part 100 and the lower part 102. The components disposed in the electronic apparatus 1 of the embodiment will be described in detail below.

Figure 2:
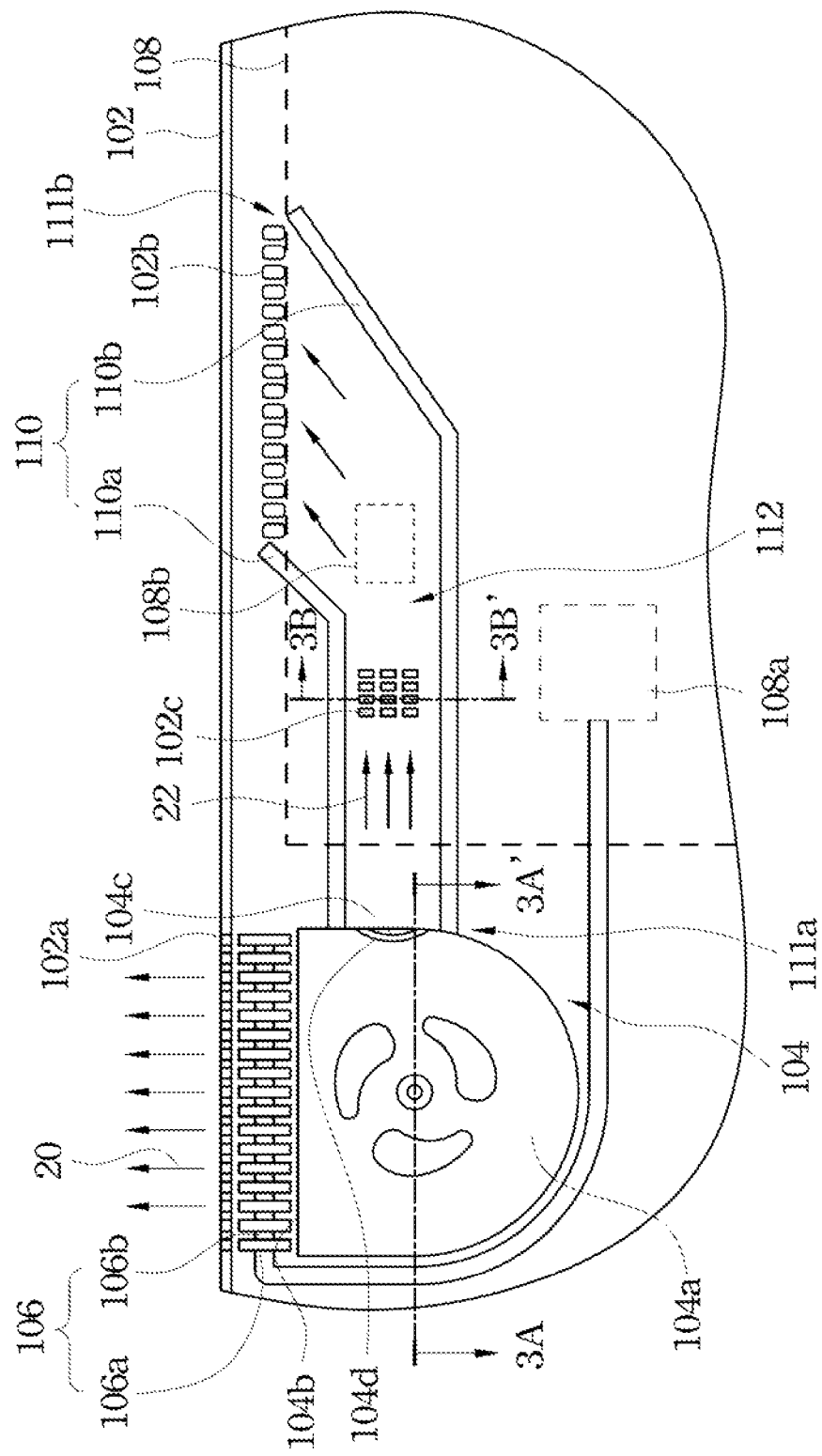
FIG. 2 is a top view showing a housing in FIG. 1, in which an upper part has been removed.
Figure 3A:
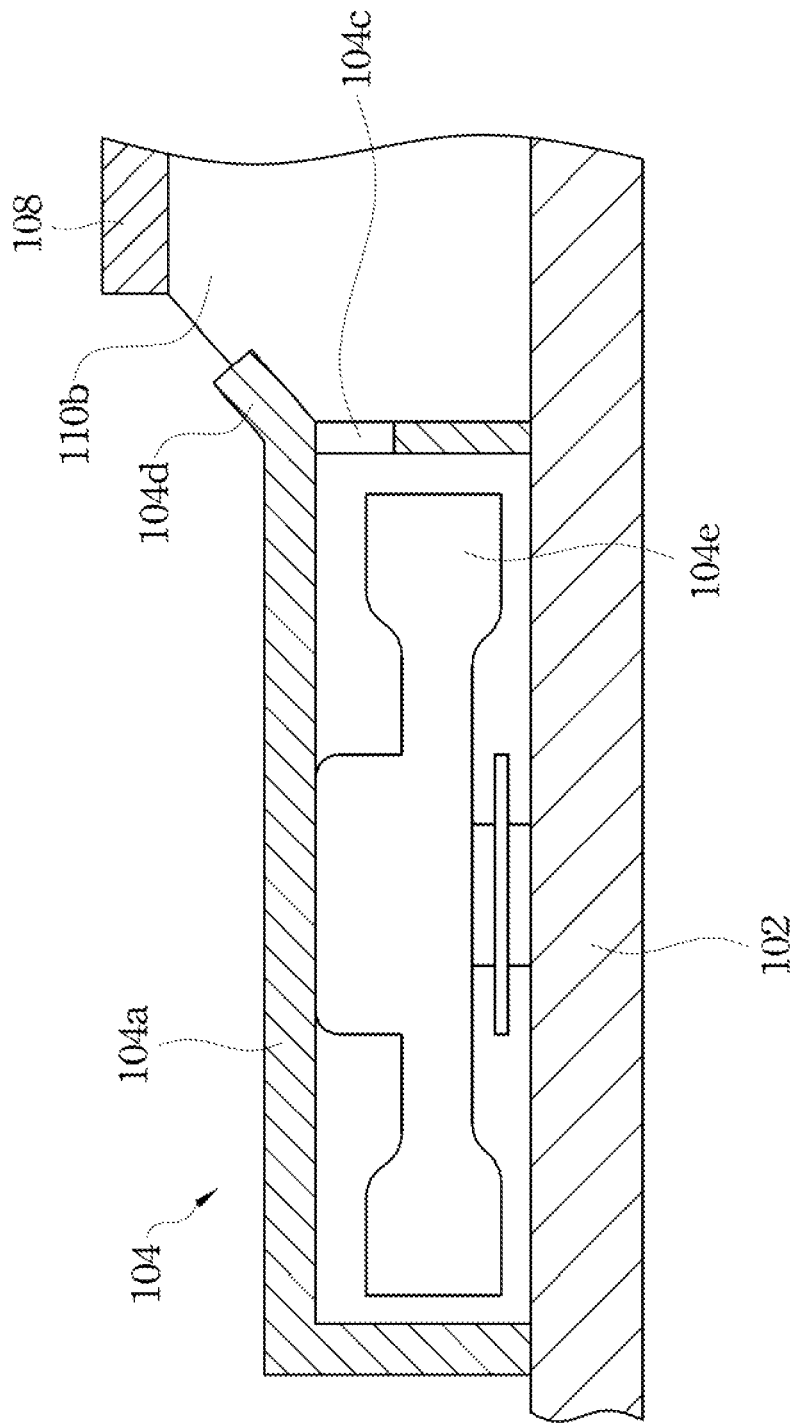
FIG. 3A is a sectional view of the housing in FIG. 2 along line 3A-3A'.
Figure 3B:
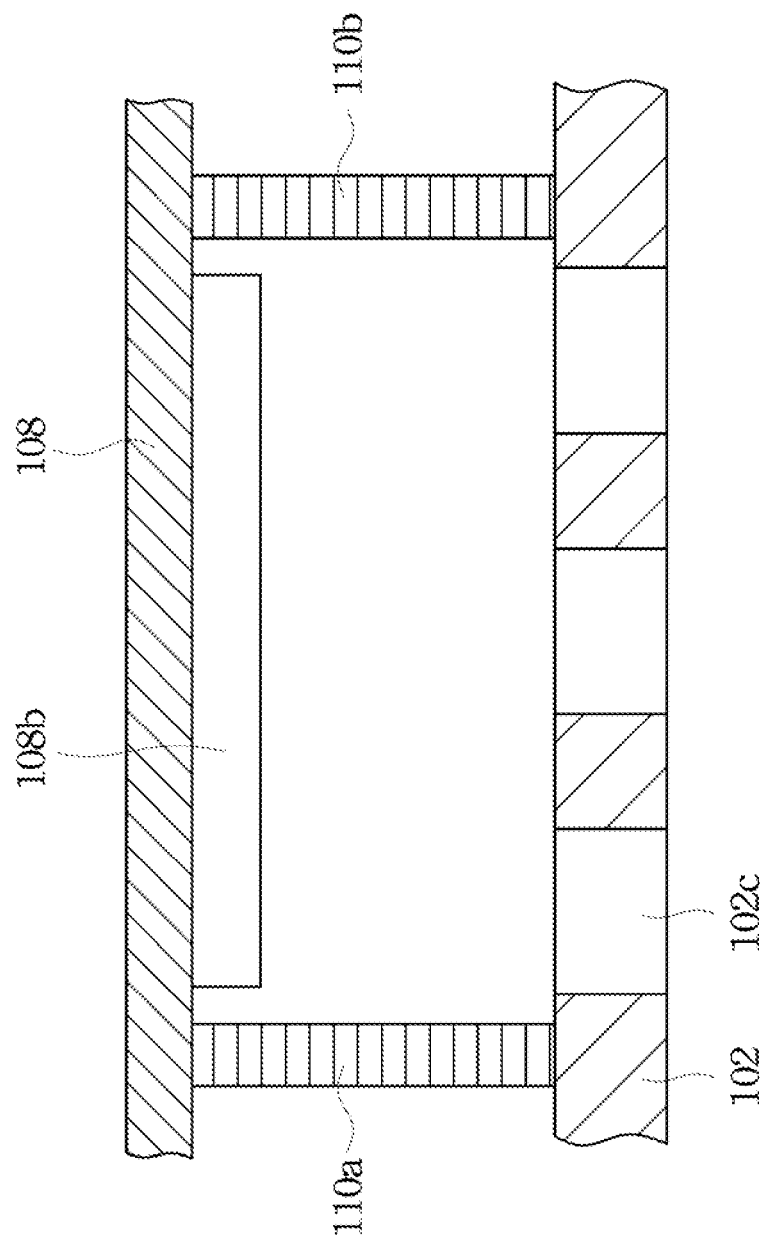
FIG. 3B is a sectional view of the housing in FIG. 2 along line 3B-3B'.

FIG. 2 is a top view showing the housing 10 in FIG. 1, in which the upper part 100 has been removed. FIG. 3A is a sectional view of the housing 10 in FIG. 2 along line 3A-3A'. FIG. 3B is a sectional view of the housing 10 in FIG. 2 along line 3B-3B'.

As shown in FIG. 2, at least one first heat-dissipating vent 102a is located at the edge of the lower part 102 of the housing 10. The electronic apparatus 1 of the embodiment further includes a fan module 104, a heat-dissipating module 106, and a circuit board 108. In the embodiment shown in FIG. 2, in which the electronic apparatus 1 is shown as a notebook computer by way of example as described above, the circuit board 108 is a motherboard of the electronic apparatus 1. The fan module 104 of the electronic apparatus 1 is disposed in the housing 10. The fan module 104 of the electronic apparatus 1 includes a fan housing 104a and a first outlet 104b. The first outlet 104b of the fan module 104 is located on the fan housing 104a. The first outlet 104b of the fan module 104 is substantially aligned with the first heat-dissipating vent 102a on the lower part 102, such that a first airflow 20 generated by fan blades 104e of the fan module 104 is exhausted out of the electronic apparatus 1 through the first outlet 104b and has a first air volume.

The heat-dissipating module 106 of the electronic apparatus 1 is disposed in the housing 10 between the first outlet 104b and the first heat-dissipating vent 102a. The circuit board 108 of the electronic apparatus 1 is disposed in the housing 10. The circuit board 108 of the electronic apparatus 1 can include a first heat source 108a. For example, the first heat source 108a may be a central processing unit of the electronic apparatus 1. The heat-dissipating module 106 is thermally connected to the first heat source 108a of the circuit board 108. The first airflow 20 thus can pass through the heat-dissipating module 106 from the first outlet 104b of the fan module 104 and then can be exhausted through the first heat-dissipating vent 102a of the lower part 102.

The heat-dissipating module 106 can include a plurality of heat-dissipating fins 106a and a heat pipe 106b. The heat-dissipating fins 106a of the heat-dissipating module 106 are located between the first outlet 104b of the fan module 104 and the first heat-dissipating vent 102a of the lower part 102. The heat pipe 106b of the heat-dissipating module 106 is thermally connected to the first heat source 108a on the circuit board 108 and connected to the heat-dissipating fins 106a, so as to conduct the heat generated by the first heat source 108a to the heat-dissipating fins 106a. Therefore, the first airflow 20 generated by the fan module 104 can pass through the heat-dissipating fins 106a from the first outlet 104b and then can be exhausted through the first heat-dissipating vent 102a of the lower part 102, so as to effectively dissipate the heat generated by the first heat source 108a of the circuit board 108.

As shown in FIG. 2, at least one second heat-dissipating vent 102b is similarly located at the edge of the lower part 102 of the housing 10. The electronic apparatus 1 of the embodiment further includes a guiding structure 110. The fan module 104 of the electronic apparatus 1 can further include a second outlet 104c. The second outlet 104c of the fan module 104 is located on the fan housing 104a. As shown in FIG. 3A, the guiding structure 110 of the electronic apparatus 1 is interposed between the lower part 102 of the housing 10 and the circuit board 108, and extends from the periphery of the second outlet 104c of the fan module 104 to the periphery of the second heat-dissipating vent 102b of the lower part 102, so as to form a channel 112 that communicates the second outlet 104c with the second heat-dissipating vent 102b.

The circuit board 108 of the electronic apparatus 1 can further include at least one second heat source 108b. As an example, the second heat source 108b may be a north bridge chip, a south bridge chip, or a VGA chip of the electronic apparatus 1. In this embodiment, the second heat source 108b of the circuit board 108 is located in the channel 112 that is formed by the guiding structure 110, the lower part 102 of the housing 10, and the circuit board 108. Therefore, a second airflow 22 generated by the fan blades 104e of the fan module 104 can pass over the second heat source 108b on the circuit board 108 from the second outlet 104c along the channel 112 and then can be exhausted through the second heat-dissipating vent 102b of the lower part 102. The second airflow 22 has a second air volume.

Because the temperature of the first heat source 108a is often higher than that of the second heat source 108b, the temperature at the first heat-dissipating vent 102a is also higher than that at the second heat-dissipating vent 102b. Moreover, because of its lower temperature, the heat generated by the second heat source 108b can be dissipated through use of only by the second outlet 104c of the fan module 104 together with the guiding structure 110. Since the temperature of the second heat source 108b is often lower than that of the first heat source 108a, as described above, the first air volume of the first airflow 20 may be made larger than the second air volume of the second airflow 22 to provide the first heat source 108a with a better heat-dissipating effect.

Furthermore, the guiding structure 110 of the electronic apparatus 1 includes a wall 110a and a wall 110b. The guiding structure 110 includes a first end 111a and a second 111b. The first end 111a is connected to the periphery of the second outlet 104c of the fan module 104, and the second end 111b is connected to the periphery of the second heat-dissipating vent 102b of the lower part 102. With this configuration, the channel 112 is formed by the lower part 102 of the housing 10, the circuit board 108, the wall 110a, and the wall 110b. Therefore, the second airflow 22 generated by the fan module 104 can pass over the second heat source 108b on the circuit board 108 from the second outlet 104c along the channel 112, and then can be exhausted through the second heat-dissipating vent 102b of the lower part 102.

It can be seen that the embodiment of the invention can effectively increase the heat-dissipating efficiency in the electronic apparatus 1 by additionally forming the second outlet 104c on the fan module 104, forming the second heat-dissipating vent 102b on the lower part 102 of the housing 10, and disposing the wall 110a and the wall 110b for guiding the second airflow 22 between the second outlet 104c of the fan module 104 and the second heat-dissipating vent 102b of the lower part 102.

As shown in FIG. 2 and FIG. 3A, the fan housing 104a of the fan module 104 includes a protuberance 104d located at the edge of the second outlet 104c. The fan module 104 can control an angle with which the second airflow 22 flows out of the second outlet 104c by adjusting the shape and projecting length of the protuberance 104d. That is, by suitably forming the protuberance 104d, the second airflow 22 generated from the second outlet 104c of the fan module 104 in the embodiment can flow directly toward the second heat source 108b of the circuit board 108, thereby dissipating the heat generated by the second heat source 108b more effectively than a parallel airflow generated by a conventional fan module.

Moreover, as shown in FIG. 2 and FIG. 3B, the lower part 102 of the housing 10 can further include at least one inlet 102c. The inlet 102c on the lower part 102 is formed at a location corresponding to the channel 112 and between the wall 110a and the wall 110b. Therefore, when the second airflow 22 generated by the fan module 104 flows over the inlet 102c of the lower part 102, the pressure at the inlet 102c in the lower part 102 will be lower than that outside of the lower part 102. Accordingly, the lower temperature air outside of the lower part 102 will be attracted to enter the housing 10 via the inlet 102c owing to the pressure difference at the inlet 102c generated by the second airflow 22, so as to effectively increase the heat-dissipating efficiency in the electronic apparatus 1.

In an embodiment of the invention, the wall 110a and the wall 110b of the guiding structure 110 can be made of a sponge material. However, the invention is not limited in this regard. As long as the material is thermostable and is capable of providing cushioning between the lower part 102 of the housing 10 and the circuit board 108, the material can be used for the wall 110a and the wall 110b of the guiding structure 110.

In an embodiment of the invention, the wall 110a and the wall 110b of the guiding structure 110 can be firstly fastened to the lower part 102 of the housing 10, and then pressed by the circuit board 108 to secure the wall 110a and the wall 110b. Each of the wall 110a and the wall 110b can be fastened to the lower part 102 of the housing 10 by using a glue adhesive, a co-injection molding method, a hot-melt adhesive, or a screw fastening method.

In another embodiment of the invention, the wall 110a and the wall 110b of the guiding structure 110 can also be firstly fastened to the circuit board 108 and then pressed by the lower part 102 of the housing 10 to secure the wall 110a and the wall 110b. In this case, each of the wall 110a and the wall 110b can be fastened to the circuit board 108 of the housing 10 by similarly using a glue adhesive, a co-injection molding method, a hot-melt adhesive, or a screw fastening method.

According to the foregoing recitations of the embodiments of the invention, it can be seen that the electronic apparatus of the invention is capable of exhausting the heat in the housing of the electronic apparatus out of a first heat-dissipating vent and a second heat-dissipating vent by a first outlet and a second outlet formed on a fan module disposed in the housing, and by forming a channel by disposing a guiding structure that is communicated between the second outlet and the second heat-dissipating vent on the lower part of the housing, in which the layout of the guiding structure is along a second heat source on a circuit board. Therefore, the present invention not only can let a first airflow that flows out from the first outlet of the fan module achieve the goal of exhausting the heat generated by a first heat source on the circuit board out of the first heat-dissipating vent, but also, the heat-dissipating efficiency of a second airflow that flows out from the second outlet for the second heat source can be greatly increased by the guidance provided by the guiding structure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic apparatus comprising:
   a housing comprising a first heat-dissipating vent and a second heat-dissipating vent;
   a circuit board disposed in the housing;
   a fan module disposed in the housing and comprising a first outlet and a second outlet, wherein the first outlet is substantially aligned with the first heat-dissipating vent and has a first airflow, and the second outlet has a second airflow;
   a heat-dissipating, module disposed in the housing, between the first outlet and the first heat-dissipating vent;
   a channel located between the second outlet and the second beat-dissipating vent for guiding the second airflow out of the housing from the second heat-dissipating vent, wherein the temperature of the first heat-dissipating vent is higher than that of the second heat-dissipating vent;
   a first heat source connected to the circuit board and thermally connected to the heat-dissipating module; and
   a second heat source located on the circuit board and in the channel, wherein the second airflow passes over the second heat source from the second outlet along the channel and then is exhausted through the second heat-dissipating vent.

2. The electronic apparatus of claim 1, wherein the first airflow passes through the heat-dissipating module from the first outlet and then is exhausted through the first heat-dissipating vent.

3. The electronic apparatus of claim 2, wherein the heat-dissipating module further comprises:
   a plurality of heat-dissipating fins located between the first outlet and the first heat-dissipating vent, wherein the first airflow passes through the heat-dissipating fins from the first outlet and then is exhausted through the first heat-dissipating vent; and
   a heat pipe thermally connected to the first heat source and connected to the heat-dissipating fins for conducting the heat generated by the first heat source to the heat-dissipating fins.

4. The electronic apparatus of claim 1, further comprising a guiding structure, the guiding structure comprising two walls and having a first end and a second end, the first end being connected to the periphery of the second outlet, the second end being connected to the periphery of the second heat-dissipating vent, the channel being formed by the housing, the circuit board, and the walls, the second airflow passing over the second beat source from the second outlet along the channel and then being exhausted through the second heat-dissipating vent.

5. The electronic apparatus of claim 4, wherein the housing further comprises at least one inlet located between the walls, and the air outside of the housing is attracted to enter the housing via the inlet by the second airflow when the second airflow passes over the inlet.

6. The electronic apparatus of claim 4, wherein the housing and the guiding structure are connected to each other using a glue adhesive, a co-injection molding method, a hot-melt adhesive, or a screw fastening method.

7. The electronic apparatus of claim 4, wherein the circuit board and the guiding structure are connected to each other using a glue adhesive, a co-injection molding method, a hot-melt adhesive, or a screw fastening method.

8. The electronic apparatus of claim 1, wherein the fan module comprises a fan housing, the first outlet and the second outlet are located on the fan housing, and the fan housing comprises a protuberance located at the edge of the second outlet for controlling an angle with which the second airflow flows out of the second outlet.

9. The electronic apparatus of claim 1, wherein the air volume of the first airflow is larger than that of the second airflow.

* * * * *